Figure 5:
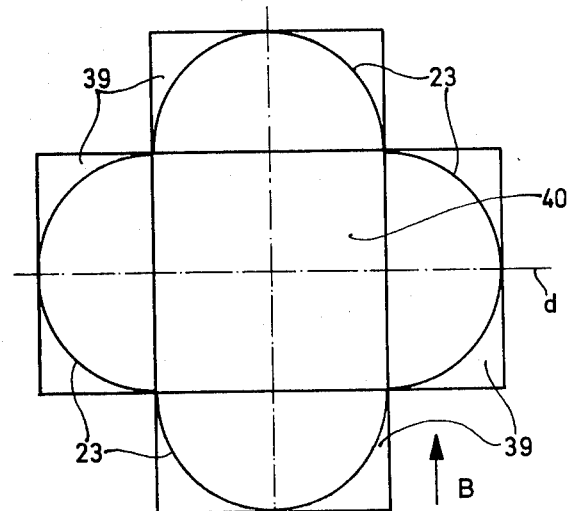

United States Patent [19]

Jüstl

[11] 3,916,836

[45] Nov. 4, 1975

[54] METHOD AND APPARATUS FOR ERECTING OR BUILDING AND HOUSING OR CONTAINING SMALL ANIMALS OR BIRDS

[76] Inventor: Fritz Jüstl, Rheinstrasse 10, D-6051 Dietzenbach-Steinberg, Germany

[22] Filed: May 7, 1973

[21] Appl. No.: 357,691

[30] Foreign Application Priority Data
May 5, 1972   Germany............................ 2221973

[52] U.S. Cl..................................... 119/17; 119/23
[51] Int. Cl........................ A01k 1/00; A01k 31/00
[58] Field of Search .............. 119/23, 17, 19, 21, 22

[56] References Cited
UNITED STATES PATENTS

| | | | |
|---|---|---|---|
| 950,902 | 3/1910 | Engel...................................... | 98/54 |
| 959,161 | 5/1910 | Peironnet............................ | 119/19 |
| 1,083,572 | 1/1914 | Warnick et al. ...................... | 119/19 |
| 1,095,628 | 5/1914 | Gabel................................... | 119/19 |
| 1,188,539 | 6/1916 | Hansen ................................ | 119/19 |
| 1,477,861 | 12/1923 | Allen................................ | 119/45 R |
| 1,634,209 | 6/1927 | Reiber .................................. | 119/23 |
| 2,034,156 | 3/1936 | Snider.............................. | 119/19 X |
| 2,174,326 | 9/1939 | Leibenguth ...................... | 119/45 R |
| 2,250,818 | 7/1941 | Sperry............................. | 119/22 X |
| 2,611,338 | 9/1952 | Yellin .................................. | 119/17 |
| 2,944,515 | 7/1960 | Mura ................................... | 119/23 |

Primary Examiner—Hugh R. Chamblee
Attorney, Agent, or Firm—Lilling & Siegel

[57] ABSTRACT

According to a first, main principle, the invention relates to a method of erecting houses for small animals or birds, which are closed on all sides, by means of wall sections and a roof, section and according to a further principle the invention relates to a building assembly for erecting such houses for small animals or birds for putting the method into effect.

36 Claims, 17 Drawing Figures

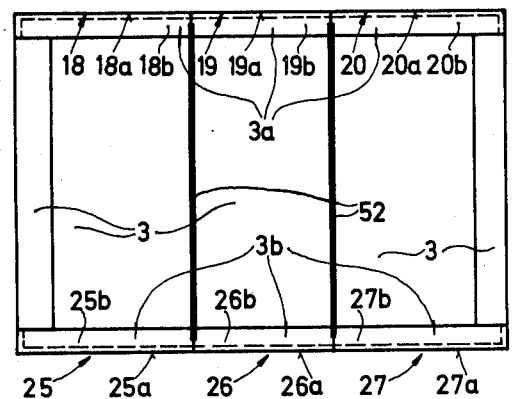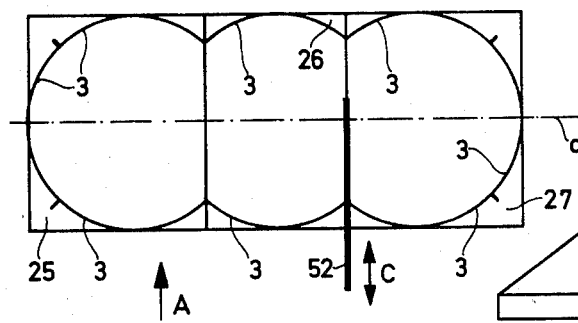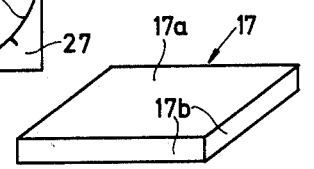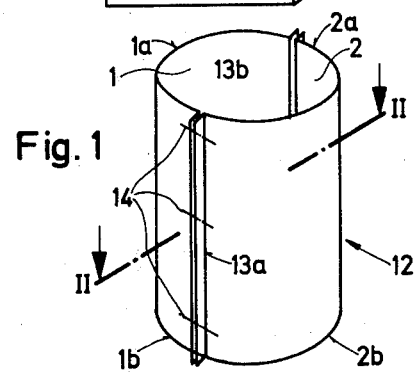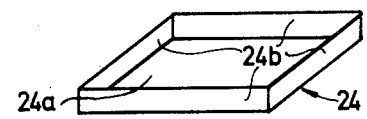

U.S. Patent  Nov. 4, 1975  Sheet 4 of 4  3,916,836

METHOD AND APPARATUS FOR ERECTING OR BUILDING AND HOUSING OR CONTAINING SMALL ANIMALS OR BIRDS

Various animal houses are already known, such as houses which may be referred to as cages, animal houses, accommodation for animals, hatches, enclosures, or preconstructed fencing. Apart from a bird cage, in which a frame made of wire netting or latticed material of predetermined shape and predetermined inside cross section, which may be polygonal, circular or oval, is joined to floor boarding; sometimes to floor and ceiling boarding, in cases where animal houses of the type specified are to be erected with larger dimensions, either a framework made up of posts, bars, tubes or the like is assembled and is covered with the trellis material or wire netting, or frames are formed from posts, bars, tubes or the like and suitable pieces of the trellis material or wire netting material are placed in position between these frames and the wall sections thus formed, which are made up of frame sections covered with latticed material or the like, are joined together in a suitable, known manner.

With these known forms of construction for animal houses there are however disadvantages, some of the main ones of which are described in the following. In all these known animal houses the manufacturing method for the house or for the individual parts required for the house is complex if they are to be constructed in such a way that the customer, or buyer, or user can assemble the parts without difficulty to produce the completed house, and moreover the cost price is high. If on the other hand the house can be made at a relatively low cost and the price therefore relatively low, this means that the customer, buyer, or user will have much more difficulty in assembling the individual parts to form the required house. In any case, apart from so-called hand cages in which birds or the like are transported, which are very small in size, the handling weights of these known animal houses for manufacture, storage, transportation and erection are relatively heavy. Because of these weights, not only the cost price but also the transshipment cost for distribution automatically affected to a considerable extent. These known constructions also give rise to further costs. For example, with an animal house of the type described, of the bird cage kind, a dealer will have to keep several sizes in stock all the time and this involves considerable amounts of capital and at the same time storage and display space must be made available. Moreover, with the relatively heavy weight of the individual parts of known animal houses of the kind described, a further disadvantage has been found in that, during storage and transport, and on display, the parts can be damaged through being bumped, through abrasion, scratching or the like and this can lower their selling price considerably leading to further financial losses in the form of reductions, for instance in clearance sales and the like.

In order to reduce manufacturing costs and the selling prices, compared with these known types of animal houses, and also to enable the animal houses to be assembled without difficulty and at the same time to be cleaned thoroughly without much manipulation, it has already been suggested that the houses should be built by forming a frame from a single piece of material taken from a supply of latticed or wire netting material wound round a roller, the two edge regions of this piece of material being shaped in a tubular form and secured on each other and the frame, then being inserted in a receiving body of suitable contour so that the surfaces are in contact, said body acting as a base for the cage which is thus formed, and finally a roof portion of similar construction and more particularly of the same contour is placed on the upper, free end of the frame in such a way that it also abuts on the frame so that there is surface contact all round.

This arrangement which does not belong to the prior art is not however able to overcome all the disadvantages of previously known designs. It does enable the animal housing to be built with larger measurements, with improved inherent rigidity of the frame, for a predetermined weight, or to have a lesser weight for specified dimensions, and in addition many of the disadvantages already described with regard to manufacture, transport and storage of the known designs are reduced by a considerable amount, however, this previous suggestion is not able to overcome the disadvantage that for animal houses of fairly large or very large holding capacity, new individual parts are always required and for every house size, suitable sizes of roof sections and floor sections on the one hand, and on the other hand the material from which the frame is formed, have to be taken and separated off from the roll. This means that the weight of the frame can be considerably reduced compared with the known designs in that with frame contours which are bent in curved form, all the frame parts are not required, and with frame contours which are polygonal, the frame parts, with the exception of vertical struts, can be discarded, said struts forming a connection between the roof section and the floor part. However, with regard to the different sizes required by customers, the disadvantage of storage, transportation, danger of damage of the roof parts and floor sections is not improved in any way. Compared with the possibilities offered by the known designs, this previous suggestion is in fact dependent on the size and contour of the roof sections and floor parts in an installation of large area, for instance a large bird cage on a balcony or in a garden, and is thus limited. In accordance with this previous proposal, only relatively simple outline shapes of enclosures or bird cages or the like can be erected. One of the main reasons for this is that in order to transport the frame material from the supplier or dealer, the single piece of material which has already been cut, has to be rolled up relatively tightly and this gives its outline a pre-tension with a fairly narrow curvature which is undesirable for several reasons, particularly because this gives the frame material a tendency to become detached from and curve away from the roof part and floor section where it should lie flat. When erecting animal houses in accordance with this prior proposal, considerable trouble must be taken to achieve a peripheral contour of the one-piece frame part which corresponds to the contour of the roof section and floor part. This requires considerable experience and judgement in order to avoid having to re-open and alter a frame tube which has once been erected, if it is found that the measurements do not correspond to those of the roof and floor parts, such an operation having unfavourable consequences for the external appearance of the house.

The object of the invention is to overcome all the disadvantages mentioned or at least substantially to reduce them, and at the same time to fulfil the following, additional objects by simple and inexpensive means:

The invention is to produce a method and a building assembly more particularly for carrying out said method, by means of which a universal construction of such animal houses is achieved which had previously been thought impossible, and at the same time the cost price, storage and transport costs and the space requirement for storage and transport is further reduced. In addition the danger of damage to the parts during storage is reduced, also the number of individual parts, which are inexpensive to make and which can be stored, transported and assembled, and which can preferably be almost fully completed immediately, is always very small, whereby in addition, as well as the rigidity being increased, namely the moment of resistance of the cross section face of the frame against buckling inwards, the possibility is achieved of further reducing the diameter of the netting material or the thickness of the plastics panel material and at the same time of reducing delivery costs still further while at the same time retaining the same strength and achieving the same advantages. On the other hand a further advantage is that an additional, considerable saving is possible, namely there is no longer any need for the dealer or retailer, for whom the largest part of the selling price is due to costs, to have a cutting appliance such as a pair of scissors or the like available, with which the wall pieces, according to the earlier suggestion have to be divided off from the roll, on which the material for the wall sections is coiled up by the manufacturer and supplied in this form, whereby a further advantage is obtained in in the form of additional saving on storage and transport costs due to the wall section pieces lying flat and only needing to be shaped into curves at the place of use.

In accordance with the principal aspect of the invention a method for the erection of houses for small animals or birds of the kind closed on all sides, by means of wall sections and a roof section at least two wall parts being without frames and of rectangular contour, and two parallel front ends shaped in the form of a curve, are place with one curved front end on the ground and detachably fixed in the desired operating position relative to the ground with parallel, straight edges which substantially touch one another, and the wall sections along these straight edges being detachably fixed to each other, forming a tube, and at least one hood-shaped cover part being placed on this tube, overlapping at least part of the edge regions adjacent its edge contour on the side away from the ground said cover part being shaped such that at least with two wall sections it has at least a single contact in the form of line contact along the face of the wall part which is perpendicular to the ground.

According to a further aspect of the invention, a building assembly for the erection of houses for small animals or birds closed on all sides by means of wall sections and a roof section, comprises at least two frameless wall parts of rectangular contour made of material which is resiliently deformable in such a way that in each wall part, two front ends which are parallel to one another can be deformed in the shape of a curve, by means for detachably fixing the wall sections to one another along the parallel straight edges which are perpendicular to the curved front ends, in order to form a tube and at least one hood shaped roof or cover section which is shaped in such a way that after it has been moved on to one front end of the tube, overlapping part of the edge regions adjacent this front end, at least with two wall parts, it is in line contact along the face of the wall part which is perpendicular to the ground.

In this connection it should be pointed out that references to a tube indicate any type of tubular structure with a boundary contour or outline or curved and/or multi angular design. In the formation of an animal house which is assembled from individual parts already mentioned, this tube is used as the frame.

It is apparent that by means of the invention, even if a simple cage of the known bird cage type is to be formed, the frame can be made more rigid compared with the previous arrangement because of the second connecting line of two wall sections, and this increased rigidity permits a reduction in weight if this is desired. The most important advantages of the invention are however due to the fact that according to the invention, at least two wall sections which are constructed and handled in the manner specified, are provided. This means that the whole problem of the erection of animal houses in the form of enclosures, large bird cages, smaller cages or the like, even if these have ground plan forms which have been selected at random, can be reduced to a number of identical or only slightly varying individual parts. At the same time it should of course be pointed out that the invention requires at least two types of parts, namely at least two wall sections and at least one roof part. However, compared with the previous proposal, the invention does not necessitate the storage of different sizes of both parts for each different housing size. In addition, the wall sections can be supplied in finished form as rectangular panels of for instance wire netting or latticed material or of a transparent plastics material or the like, and this considerably reduces the disadvantages mentioned with regard to storage space, handling during storage, transport and costs.

Conveniently, at least one roof section is used which has a roof surface with a multi-angular contour which abuts on at least two wall sections with at least one line contact and which encloses the edge contour of the tube remote from the ground, in the form of an envelope curve. Advantageously there is at least one cover part having a covering face of rectangular contour. Moreover, it is advantageous to use at least one cover part which has a cover surface with a boundary edge which is perpendicular to a symmetrical line of the tube and which has lateral flanges extending along all the other multi-angular edges of its covering face and approximately perpendicularly to the cover face, while the edge region which is perpendicular to the symmetrical line is without flanges.

Preferably at least one roof part is used which has a covering face with two boundary edges which are perpendicular to the same symmetrical line of the tube and which has lateral flanges extending along all the other edges of its covering face and approximately perpendicularly away from this face, while the lateral edge regions which are perpendicular to the symmetrical line are without flanges.

By using the preferred embodiments of the cover or roof parts which have been described, a further important advantage is obtained over the previous arrangement, namely that it is no longer necessary to depend on a well fitting surface contact between the tube or the frame and the cover part. Instead freedom to work is provided solely with line contact and this makes it possible to produce a variety of contours of the frame with a single cover part contour, for instance with a rectangular contour of the covering face. Furthermore, disadvantages described which result from faulty assembly are largely overcome.

It has been found convenient in many instances to pre-shape the wall sections at their front end into a curve so that they are ready for use. They can be made of transparent plastics material in order to obtain a clear body or frame. On the other hand it may be preferably to make the wall sections out of wire netting. The term wire netting used here also covers latticed steel material and the like.

The means for detachably securing the wall sections together advantageously comprises hooks and eyes, by means of which the wall sections can be fastened together. According to another preferred arrangement, the means can have clamping and/or screwing members for fixing the wall sections together in a detachable manner, by means of which the wall parts can be connected to each other along their parallel edges.

Conveniently the building assembly has at least one device for fixing the tube formed from the wall sections in relation to the ground, in a detachable manner. This device may be formed by a set of stakes, pegs or the like so that the frameless wall sections are secured relative to the ground by means of holding members, namely these stakes, pegs or the like which can be brought into operative engagement with the edge regions of the wall parts which are adjacent the edge contour near the ground. In a further arrangement the means for securing the tube relatively to the ground may be formed by a trough which is positioned on the ground and the frameless wall sections which form the tube are inserted in said trough with their curved front end which is not covered by the roof portion, and the lateral walls of said trough define the curved contour of the wall sections. The trough is advantageously made of several parts, each of which has a floor surface area of polygonal contour which abuts on at least two wall sections at least with single line contact, and which encloses the edge contour of the tube which is next to the ground, in the form of an envelope curve. Production can be simplified and costs lowered if, at least one cover part is used to form the trough.

Increased strength and rigidity can be achieved if the wall sections are constructed so that they rest in a resilient manner on the cover part and/or the trough part. In addition it has been found preferably in many instances to fix the wall sections to the associated cover part and/or trough part in a detachable manner by means of a catch member. Moreover, where several cover parts and/or trough parts are present, adjacent cover parts or trough parts can be secured together by means of quickly releasable catch members.

Advantageously the wall parts are provided in their non-curved straight edge regions and the cover part or parts and/or the trough part or parts are provided in their corresponding regions with a slit for receiving a dividing wall which can be moved diagonally and/or removed. To achieve this while preserving the previous advantages, a wall section which is not shaped in a curved form, which is therefore even, or several such wall sections which are coupled together, can be used as a dividing wall. In this way it is possible to clean an animal house as described even one which is in use, in a quick and thorough manner, without the need to remove the animals, and with simple, easy means. This is possible in that the animals are simply driven to one side of a dividing wall position and the dividing wall is then inserted so that it divides the cage area or the like, the area which is free from animal being then cleaned, re-arranged or new litter is put down or any necessary operations are carried out. The animals are then allowed back into the freshly prepared living area by pulling the dividing wall out and the wall is then pushed in again in the same way so that the other half of the cage or the like can be cleaned in the same or similar way. The advantages of this arrangement with regard to simplified and less expensive maintenance are plain in particular for large animal houses of this kind, like multi-compartment outdoor bird cages or the like. A further preferred arrangement provides many advantages, particularly with regard to the maintenance of the animal houses in conjunction with the embodiment last described, though being not limited to such combination. In this arrangement the trough has a tray which can be pulled out like a drawer, said tray catching excrement left over food scraps and the like. In addition, at least one of the wall sections advantageously has a door opening made therein. This can be constructed as a hinged door which is the most convenient if the wall sections are made of wire netting or latticed steel material, or it can be constructed as a sliding door, which is advantageous if the wall parts are made of plastics panel material.

It is often desirable to give certain animals as well as the people visiting them, the impression of natural surroundings showing the natural living accommodation of these animals. The invention provides the possibility, through a further embodiment, in which the wall sections have areas which have substantial overlap with areas of adjacent wall parts and which are adjacent the non-curved straight edges of the wall sections, and a sheet or the like with pictorial illustrations, preferably panoramic pictures, can be inserted in the gap between the overlapping areas of the wall sections. In this way, not only may animal houses be made particularly attractive, but in addition a building assembly designed in this way, may be used for erecting houses for all sorts of animals even if it is necessary to create an impression of the natural surroundings of these animals. Particularly if the wall sections are made of transparent plastics material the additional advantage is provided that after the animal house has been assembled, the sheet covered with illustrations which acts as a picture wall, is protected on both sides against being dirtied or damaged.

This picture wall may however be replaced as required and if necessary it may even be adapted to fit the occupants of the animal house, regardless of the type and design of the wall sections. The expense for this measure which serves to heighten the aesthetic enjoyment of the spectator and/is also psychologically therapeutic for the animals, is only small.

The invention will now be explained in greater detail with reference to the drawings, in which FIG. 1 is a diagrammatic view in perspective of the individual parts, shown separately, of a building assembly for erecting a cage of the bird cage type.

FIG. 2 is a diagrammatic illustrations of a view of an assembled cage along the line II—II of FIG. 1.

Figure 6:
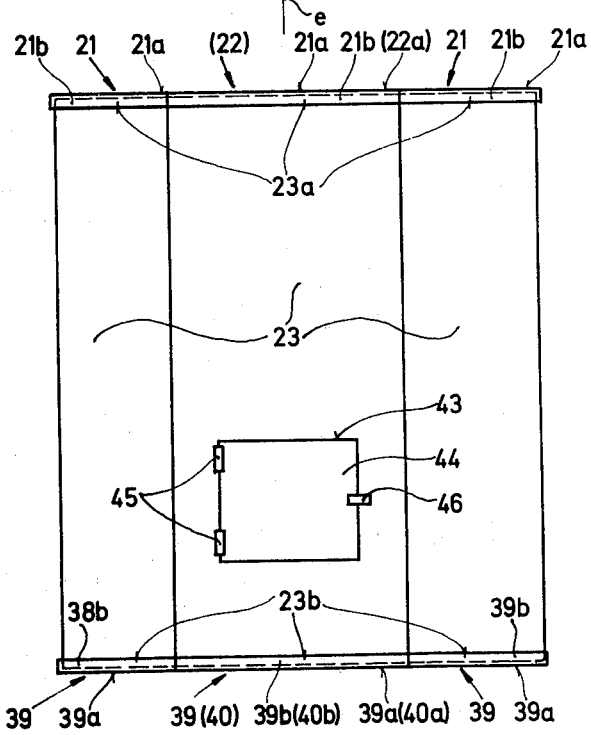
Figure 7:
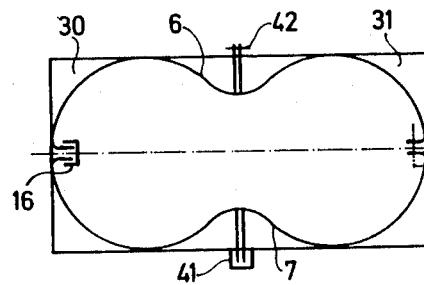
Figure 11:
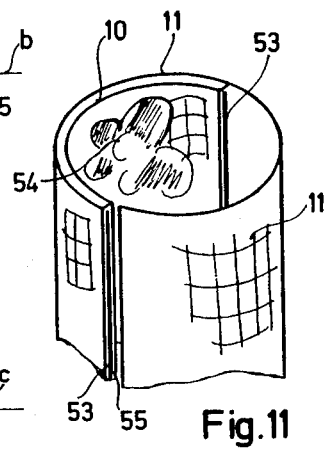
Figure 8:
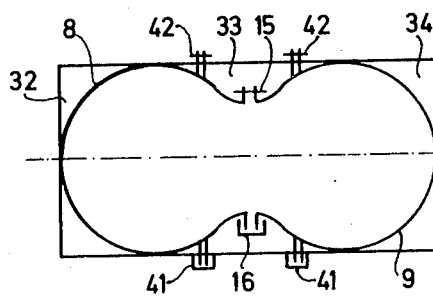
Figure 9:
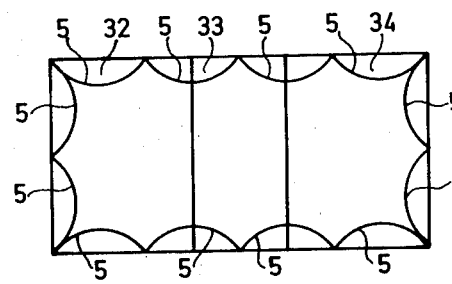
Figure 10:
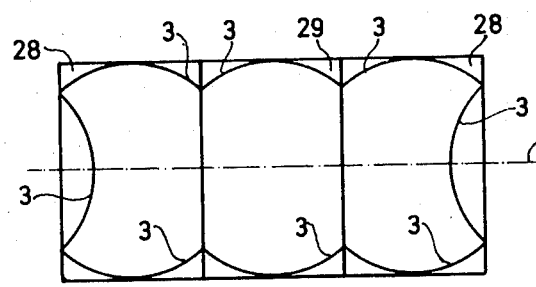
Figure 12:
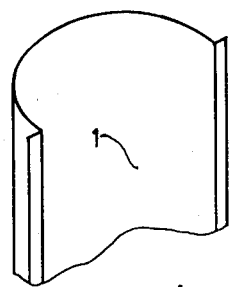
Figure 13:
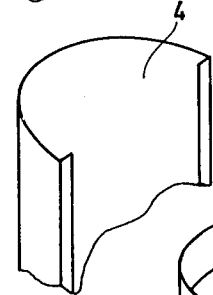
Figure 14:
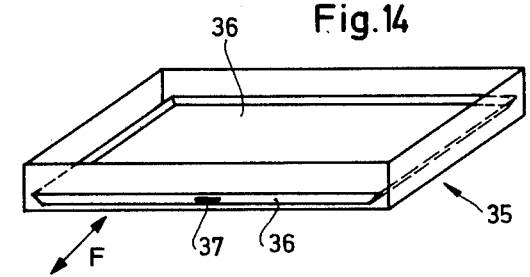
Figure 15:
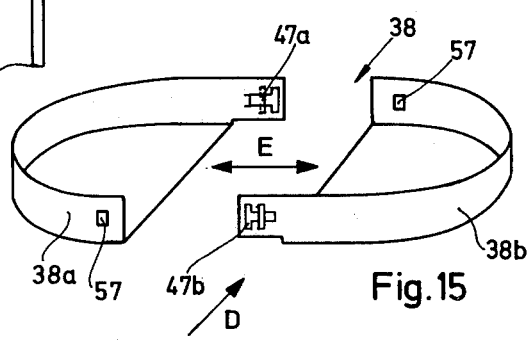
Figure 16:
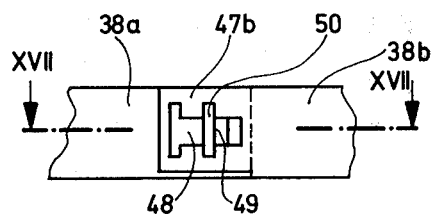
Figure 17:
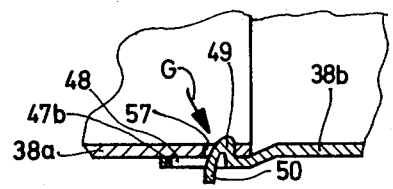

FIG. 3 is a diagrammatic floor plan view for a bird cage with three compartments formed from similar wall sections with two different types of cover or roof sections, FIG. 4, shows the accompanying side view from direction A in accordance with FIG. 3, FIG. 5 is the floor plan arrangement diagram for a bird cage arbour, FIG. 6 is the appertaining side view from direction B in FIG. 5, FIG. 7 is the floor plan diagram for the arrangement of an embodiment which is particularly suitable as a room or balcony bird cage, with dog bone floor plan in a two part body design with two identical roof sections, FIG. 8 is the floor plan diagram of a corresponding embodiment of a bird cage in accordance with the invention with three roof parts or trough parts respectively, FIG. 9 is the floor plan diagram for an embodiment with baroque style contouring made up of a plurality of identical wall sections, this embodiment being particularly suitable for outdoor bird cages, FIG. 10 shows the floor plan diagram of an animal house in accordance with the embodiment according to FIG. 3 in which however, in spite of the same number of wall members of the same size, it is possible to use three identical roof sections with a slight reduction in the inside area of the cage, FIG. 11 is a perspective view of a partial view of the upper front end of a frame or body formed from two wall portions, with a slit for receiving a sheet or the like with pictorial illustrations, FIG. 12 shows in the view according to FIG. 11, the end region on the front side of a curved wall section with outwardly curved end flanges on the straight edges, FIG. 13 shows, in a view corresponding to the view in FIG. 12 a similar wall section with inwardly curved end flanges on its straight edges, FIG. 14 is a perspective view of a rectangular trough part with a tray for receiving excrement or the like, which can be pulled out like a drawer, FIG. 15 is a diagrammatic view in perspective of the two halves, shown separately, of a floor trough of approximately circular contour with surface contact relatively to the wall sections of the body which are to be inserted, FIG. 16 shows on an enlarged scale a detail of the securing tongue of one half of the trough part shown in FIG. 15, seen from the direction of the arrow D and FIG. 17 is a sectional view along line XVII— XVII in FIG. 16.

In these drawings parts which correspond to one another are indicated by the same reference number.

In FIG. 1 and FIG. 2 numerals 1 and 2 indicate wall section parts of semi-cylindrical shape. The front ends 1a and 2a or 1b and 2b respectively of these wall parts 1 and 2 are curved, approximately in the shapes of part circular cylinders. The straight edges 13a or 13b which are perpendicular to the curved front ends 1a and 2a or 1b and 2b respectively of the wall sections 1 or 2, which are rectangular in shape in their original state, are bent outwardly in the shape of flanges and thus form simple means for securing the wall sections 1, 2 together for the purpose of forming the frame or body for an animal house of smaller dimensions. The flanges which are bent outwardly and which are not shown in detail in FIGS. 1 and 2 but which are particularly clearly seen in FIG. 12, form suitable abutments for coupling members for connecting the individual wall parts 1, 2 to the required frame. Instead of two wall sections 1, 2 shown in FIG. 1 or 12, two similar wall sections 4, in accordance with FIG. 13, can be used. The flanges, and thus the wall sections 1, 2 or 4 respectively, are fixed together in a detachable manner along their straight edges 13a, 13b by means of suitable securing means.

Such securing means are indicated in FIGS. 1 and 2 by way of example, in the form of bolts 14 which pass through holes suitably arranged in the flanges, only the centre line of these being shown. Suitable clamping members 16 may however also be used to form the body 12, which can be described as a tube because of its geometrical shape, these members shown in diagrammatic form in FIGS. 7 and 8.

In addition, in FIG. 1, the cover part 17, the covering face 17a of which has a rectangular contour, with the lateral flanges 17b which stand vertically away from the covering surface 17a, and also the trough part 24 which also has a floor space 24a of rectangular contour, are shown, in which trough lateral flanges 24b extend vertically away from the outer contour of its floor face 24a. It can be clearly seen from FIG. 2 how the tube 12 which forms the body of the cage is inserted in the receiving area of the trough part 24 in such a way that the lower boundary contour 1b, 2b on the front side is upright on the floor surface 24a and the two wall sections 1 or 2 respectively are in line contact twice with the side flanges 24b of the trough part 24.

In the further embodiment in FIG. 3 and FIG. 4, in the form of a bird cage for a room, the tube which is not described in any greater detail here, is made up of eight identical wall sections 3, this being made possible by said wall sections being inserted with their lower curved front ends into the receiving area of a floor trough which is composed of two trough parts 25 and 27 and a further trough part 26 which is different compared with the parts 25 and 27. The wall sections 3 are detachably connected along their straight edges, preferably in the same way as was described in connection with the embodiment shown in FIGS. 1 and 2. The corresponding side flanges along the straight edges of the wall sections 3 or other suitable means are not shown in FIGS. 3 and 4 for the sake of clarity.

It can be seen from the floor plan diagram in FIG. 3 that the floor trough which is made up of the trough parts 25, 26, 27 is also rectangular in shape and that the outer boundary contour of this (as can be seen from FIG. 4) is formed by the lateral flanges 25b, 26b and 27b respectively of the trough parts. For this, for the lateral trough parts 25 or 27, such trough parts are chosen which have a boundary edge to their floor surfaces 25a or 27a which is perpendicular to a symmetrical line a of the tube, the tube in this case consisting of a tube-type body with two constrictions, and which have side flanges 25b or 27b which extend along all the other polygonal edges of their floor surface, approximately vertically away from said surface, whereas the edge region which is perpendicular to the symmetrical line a is always without flanges. The central trough part 26 which is arranged between these two outer trough parts 25 and 27 and which is fastened to these on both sides, is of different construction. Apart from its width, which is smaller compared with the other parts, its floor face 26a has two boundary edges which are perpendicular to the symmetrical line a of the tube which is not shown in detail, and along all the other polygonal edges of its floor surface 26a, in this case the pair of opposing, remaining rectangular sides, it has side flanges 26b which extend approximately vertically away from the surface 26a whereas the regions of the side edges which are perpendicular to the symmetrical line a, are without flanges.

The roof or cover parts 18, 19, 20 shown in FIG. 4 are constructed in a similar way. The cover part 18 with its covering face 18a and its lateral flanges 18b corresponds to the trough part 25, and the cover part 20 with its covering face 20a and its lateral flanges 20b corresponds to the trough part 27, and the cover part 19 with its covering surface 19a and its lateral flanges 19b corresponds to the trough part 26. It is apparent that the lower edge contour 3b on the front side of the tube or the body is supported on the inside of the floor surface 25b, 26b, 27b, while the inside of the cover face 18a, 19a, 20a, of the cover parts 18, 19, 20 which are connected together to form one unit, rests on the upper front end edge contour 3a of the tube. This provides the whole bird cage assembly with sufficient internal rigidity. However, as an additional security, the individual cover parts 18, 19 or 20 respectively and/or the individual trough parts 25, 26, or 27 respectively can also be secured in a suitable manner (not illustrated) relatively to the wall parts 13 associated therewith, and this can for example be effected by means of rapidly releasable catch members (not illustrated).

Instead of the lower edge contour 3b of the tube or body on the front side, being fixed in relation to the ground by being inserted in a base or support trough 25, 26, 27, the body or tube can also be fixed relatively to the ground by holding members such as stakes or pegs or the like (not shown) said members being operatively connectible with the edge areas of the wall members 3 nearest the ground.

In the embodiment shown in FIGS 3 and 4, the trough members 25, 26, or 26, 27 and the cover parts 18, 19, or 19 20 respectively as well as the wall members 3 which are approximately parallel to the symmetrical line a, are joined together at the top and at the bottom only, with their junction points which are associated with the junction points of the trough parts or cover parts respectively, however, they are able to exert their supporting action through the combination of the cover parts and the trough parts to a sufficient degree. In the mid region the wall sections 3 have recesses of suitable size near to their junction points, in the same way as the cover and trough parts. These recesses form in combination a guide slit for a sliding wall 52 which is either constructed as a transparent plastics panel or as a latticed wall which is guided in suitable guide rails or in other convenient or desired form. This sliding wall 52 can be pushed into the interior of the bird cage or can be pulled out of it, in the direction of the arrow C as shown in FIG. 3, in such a way that the interior of the cage can be divided according to requirement into two or three compartments, or it can be kept as a single compartment. The advantages obtained with regard to the maintenance of a cage such as this, particularly from the point of view of cleaning, have already been described. The construction of a cage which corresponds to the embodiment shown in FIGS. 3 and 4 is indicated in FIG. 10. This is formed from the same wall section 3 as in FIGS. 3 and 4. Only the width of the middle through part 29 is the same as that of the two outer trough parts 28. The same applies for the construction of the cover or roof parts which cannot be seen from the floor plan diagram in FIG. 10 but which are otherwise identical. It is preferable, for the same structural members to be used for the cover parts as for the trough parts 28 or 29 respectively. It is however by no means necessary for the middle trough part 29, or the corresponding cover part, to be constructed differently from the lateral trough parts 28 or the associated cover parts. FIG. 10 is a good example to illustrate how the construction may have eight identical wall parts 3 and six identical structural parts 28, of which three form the floor trough and three are used for the cover part. No additional tools are required for assembling the parts, in fact the individual components are just put together in the way prescribed by the invention, so that a sturdy cage can be erected rapidly, simply and inexpensively, and furthermore the cage which is thus produced can be extended according to requirement simply by adding extra parts 28 and inserting further wall sections 3. It is only necessary to join the parts 28 together to obtain a sufficient connection, however, it has often proved convenient particularly for larger cages, also to fix the wall parts together.

An indication is given in the embodiment shown in FIG. 9 how an animal enclosure with a relatively large internal area and with a baroque-type outer contour, which is often desirable from an architectural point of view, can be obtained over the junction points of the trough members 32, 33, 34 or of the associated cover parts, by means of a plurality of relatively small or narrow wall sections 5. No further detail is given with regard to the individual securing means of the trough parts 32, 33, 34 and/or of the associated cover parts or the individual wall sections 5 respectively, fixing these together.

The embodiments shown in FIGS. 7 and 8 show two preferred embodiments of cages in dog bone shape. In FIG. 7, a tube which is not shown in detail is inserted in the floor trough which is made up of the two identical halves 30 and 31 and which is held together at 42 by screw means and/or as indicated with 41, by means of clip members. Said tube is formed from two curved wall section 6 and 7, whereby both wall sections are joined together at their points of intersection which have inwardly curved flanges along their straight edges. The preferred types of connection by means of screwing which have already been discussed, are indicated at 15 on the right, and the method using clip members is indicated on the left at 16. The symmetrical line, with regard to which the halves 30 and 31 of the trough part are equipped in the manner described with lateral flanges, is indicated with b.

Whereas in the embodiment shown in FIG. 7, the tube is divided lengthwise, the same shape is obtained in FIG. 8, with wall sections 8 and 9 which are curved in a different way, said sections also being connected together by means of screw coupling 15 and/or clamping 16. The floor trough and accordingly the cover part are formed from three pieces 32, 33, 34, in contrast to the embodiment shown in FIG. 7, and the middle piece 33 is different compared with the two outer pieces 32 and 34 which are identical. The pieces 32 and 33 and 34 of the trough section are held together by screw couplings 42 and/or clamping means 41, in the same way as the associated parts of the cover section which are not visible. The symmetrical line, compared with which the pieces 32, 33, 34 can be constructed in the same manner as the pieces 25, 26, 27 in FIG. 3, is indicated here with c.

In the bird cage arbour shown in diagrammatic form in FIGS. 5 and 6, the basic construction is again the same. A cross-shaped receiver trough 39, 40 with lines of symmetry d and e is formed from a central, cruciform trough section 40 and four additional trough members 39 which are grouped around said section 40 in the form of a cross and which are connected to said section. The trough parts 39 and 40, as shown in FIG.

6, have floor walls 39a and 40a and side flanges 39b and 40b respectively. The cover parts 21 and 22 are identical to the associated trough parts 39 and 40 respectively and have cover faces 21a and 22a and side flanges 21b and 22b. Side flanges 40b and 22b are not required in the two central areas 40 and 22 respectively.

The four wall sections 23 which are shaped in semicircular form with their opposing front edges 23a and 23b fixed together along their straight edges form a tube and are all inserted as a body into the receiving areas of the trough sections 39, 40 or cover parts 21, 22 respectively, which are joined together in the manner already described, and this is done in such a way that the lower front side contour 23b fits preferably on the surface 39a of the floor, while the inside of the roof face 21a is situated against the upper, front side, edge contour 23a of the tube which forms the body. In the wall section 23 which points forward, an entrance or contact aperture 43 is located which is closed by means of a hinged door 44 which can be pivoted in any desired known manner, for instance by means of hinges 45 on the wall section 23, and which is fitted with a locking or closure device 46. A sliding door can also be used instead of the hinged door shown in the drawing, this also being known to a person skilled in the art, and this is particularly suitable if the wall sections are made of plastics material.

A rectangular trough part 35 is shown in FIG. 14, the function of which does not need to be explained in any further detail. A tray 36 for receiving excrement, scraps of food or the like which is provided with a handle 37 to facilitate handling, is located in said part 35 so that it can be pushed like a drawer in the direction of the arrows F.

A floor trough 38 is shown in FIG. 15 which is intended to abut with its lateral flanges 38a and 38b with well fitting surface contact, on a correspondingly contoured tube or body, whereby in many cases a particularly good cohesion under the action of the frictional forces can be obtained through the outwardly directed elasticity inherent in the material of the wall section. The floor trough 38 is approximately circular in shape and is constructed from two approximately semicircular trough halves through movement against the arrows E. At the same time, the joining together of the two trough halves 38a and 38b is made easier by means of the self locking members shown clearly in FIGS. 16 and 17.

These self locking members are formed by an extension lug 17a and 47b provided on one front end side of the peripheral flanges 38a and 38b and a tongue 49 is beaten or pressed out of this or formed in another manner and said tongue is bent towards the inside and forms a catch hook 49 which engages in a corresponding hole 51 in the other front end region of the other flange 38a or 38b respectively as soon as the two trough halves are pushed together against the arrows E shown in FIG. 5, and the two trough halves hold together to form a relatively rigid base trough for the body which is to be inserted. The hole 48 in the lugs 47b is shown clearly in FIG. 16 with its T-shaped contour, the material from this hole being shaped into the catch hook 49 shown in FIG. 17, with a front edge which extends in a sliding manner, the end region 50 of this acting as a cross piece, if the two halves of the trough need to be uncoupled later. The two trough parts are joined together to form a stable trough by means of a simple movement pushing them together, as a result of which the locking members 49, 51 automatically move into operative engagement. In order to disconnect the parts, a slight pulling force is exerted in the direction of the arrow G on the cross piece 50 which causes the catch hook 49 to move out of engagement with the edge contour of the holes 51 and the two halves can then be disconnected without difficulty.

A further, particular embodiment of the invention is shown in FIG. 11. A screen with pictures on it made of a suitable sheet material 53 such as paper, plastics or materials covered with plastics, is inserted into a space or slot 55 formed between the wall sections 10, 11 which overlap in other areas and on the side of this screen 53 which faces the inside of the tube formed by the two wall sections 10 and 11 made of latticed wire material, pictures 54 are provided which can for instance be in the form of panoramic views, of leaves and trees or rocks or the like. Apart from the properties possessed by such an animal house of increasing the aesthetic pleasure of the onlooker, this embodiment frequently has a therapeutic effect with regard to the psychology of the animals in that in these houses, animals which are away from their natural surroundings frequently adapt more quickly and easily to these surroundings which resemble their own living conditions.

It should be noted that where wire netting or latticed material or the like is used, corresponding plastics materials can also be used successfully. This is sometimes even better as for instance in the embodiment shown in FIG. 11, where the screen or sheet 53 on which pictures are provided is protected to a considerable extent against damage by the overlapping areas of the plastics material. It should also be noted that the invention is not limited to the method of shaping the wall sections into curved forms but many other shapes may be used. In particular, wall sections of varying effective radius can be joined together to form the tube. It is only important that the sections must be shaped with a concave or convex curvature and the tube or body must be made up of at least two wall sections.

Furthermore, the invention has only been explained by way of example on the basis of the preferred embodiments shown and is not limited to these. There are many more possibilities open to a person skilled in the art for adapting the invention to the structural opportunities and requirements of particular cases of use by combining the inventive features in different ways or by using different means which act in the same way.

I claim:

1. A housing or the like for animals, birds and the like, the housing comprising:
    an elongated tube formed from a plurality of joined wall elements, the tube having a closed boundary contour formed of a plurality of discontinuous arcs, each arc being formed of at least one complete wall element; the junctions of adjoining arcs comprising the joints of two wall elements, the junctions of adjoining arcs each forming a straight line parallel to each other and perpendicular to the symmetry line of the tube; each wall element being formed of a bent sheet of material, the sheet being bent so as to have a curvilinear cross section, each element having two curved parallel front surfaces and two longitudinal edges, each element being releasably joined to an adjacent element at each longitudinal edge; and a hood-shaped cover having a top enclosing surface, covering the top end of the elongated tube, and a plurality of straight side surfaces extending around the entire perimeter thereof, the side surfaces extending towards the tube and being substantially parallel to the axis of said tube; each wall element being in contact with at least one of said straight side surfaces, the contact being solely tangential, line contact along a line parallel to the axis of the tube member; the boundary contour of the cover forming a straight-sided polygon.

2. A building assembly acording to claim 1, in which the wall sections have regions which substantially overlap regions of the adjacent wall sections said regions being at the non-curved straight edges of the wall sections respectively, and a sheet or the like with pictorial illustrations, preferably panoramic views, can be inserted in the gap between the overlapping regions of the wall sections.

3. The housing of claim 1, wherein each wall element has a cross-section forming a single curve.

4. The housing of claim 3, wherein each wall element comprises in addition a flange integral with the curved surface, at each longitudinal edge of the curved element.

5. The housing of claim 4, wherein each flange extends outwardly from the curved surface.

6. The housing of claim 4, wherein each flange extends inwardly of the curved surface, whereby when the wall elements are joined, the flanges extend inwardly towards the interior of the tube.

7. The housing of claim 4, wherein the wall elements are joined by bolts inserted through the flanges.

8. The housing of claim 4, wherein the flanges of adjacent bent sheets are joined by clamps.

9. The housing of claim 3, wherein a receiving slit is provided, between two wall elements at their longitudinal edges, at two opposing locations along the tube, and in the corresponding locations of the cover part, the slit being designed and adapted to receive a slidably removable dividing wall to form two chambers within the tube.

10. The housing of claim 1, wherein all of the wall elements are substantially congruent and wherein the hoodshaped cover is formed of a plurality of sections, detachably connected, the side surfaces of each rectangular section being in contact with at least two different wall elements.

11. The housing of claim 10, wherein the cover has a generally rectangular plan configuration.

12. The housing of claim 10, wherein the cover comprises two rectangular portions, each having a horizontal surface, three perpendicularly extending side surfaces and a boundary edge, each side surface being at right angles to the other around the perimeter of the horizontal surface.

13. The housing of claim 12, wherein the cover comprises in addition at least one central rectangular portion located intermediate two outer rectangular portions, the central rectangular portion having a rectangular horizontal surface defined by four edges, two edges of which are boundary edges, free from side surfaces, and each boundary edge being juxtaposed against the boundary edge of one outer rectangular portion.

14. The housing of claim 10, wherein the cover has more than four straight sides, and wherein the angle formed by each pair of adjoining sides is a right angle.

15. The housing of claim 10, wherein at least some of the wall elements curve inwardly towards the center of the tube.

16. The housing of claim 15, wherein all of the wall elements curve inwardly towards the center of the tube.

17. The housing of claim 10, wherein all of the wall elements curve outwardly away from the center of the tube.

18. The housing of claim 1, comprising, in addition, securing means on said tube, for releasably securing 19. The housing of claim 1, comprising in addition, slidably removable drawer means in the bottom thereof, for collecting waste material.

20. The housing of claim 1 wherein the wall elements are formed of a transparent plastic sheet material.

21. The housing of claim 1, wherein at least one of the wall elements has an opening formed therethrough and comprising in addition door means operatively connected to the wall element capable of exposing and covering the opening.

22. A method for erecting housing for animals or birds or the like, the method comprising:
1. forming a plurality of rectangular sheets of a resiliently deformable wire netting material having substantially flat surfaces;
2. bending each rectangular sheet to render the faces of each sheet curved so that each bent sheet has a curvilinear cross-section and two longitudinal straight edges;
3. detachably connecting the plurality of sheets, to form a vertical tubular member having curved sidewalls, open at each end of the tube, along the straight edges;
4. placing a hood-shaped cover over and around the upper portion of the tube so that the upper end of the tube is closed and upper portions of the sidwalls are contacting portions of the cover at a plurality of points spaced around the entire perimeter of the cover.

23. The method in accordance with claim 22, wherein each rectangular sheet is bent into a substantially arcuate cross-section.

24. The method of claim 22, wherein each sheet is bent into a continuous curve.

25. The method of claim 22, wherein the bent sheets are placed within a trough means resting upon the ground which is substantially identical in shape to the cover means.

26. The method of claim 22, wherein each sheet is bent into an undulating shape.

27. A housing or the like for animals, birds and the like, the housing comprising:
an elongated tube formed from a plurality of wall elements, the wall elements being each formed of a bent sheet of wire mesh material, each sheet being bent so as to have a curvilinear cross section, each element having two curved parallel front surfaces and two longitudinal edges, each element being releasably joined to an adjacent element along each longitudinal edge to form said tubes;
a hood-shaped cover having a top enclosing surface, covering the top end of the elongated tube, and a plurality of straight side surfaces extending around the entire perimeter thereof, the side surfaces extending towards the tube and being substantially parallel to the axis of the tube;
each wall element being in contact with at least one of said straight side surfaces, the contact being solely tangential, line contact along a line parallel to the axis of the tube member;

the boundary contour of the cover forming a straight-sided polygon.

28. The housing of claim 27, wherein the tube is substantially cylindrical in shape and is formed of only two side elements.

29. The housing of claim 28, wherein the cover has a substantially rectangular plan configuration, and wherein the wall elements of the tube each contact at least two sides of the rectangle.

30. The housing of claim 27, wherein the tube is formed of more than two side elements, and wherein the hoodshaped cover has a polygonal plan configuration.

31. The housing of claim 27, wherein the cover has a generally rectangular boundary contour.

32. The housing of claim 27, wherein each wall element has a cross section forming a single curve.

33. The housing of claim 32, comprising in addition a trough member, substantially identical to the cover member and juxtaposed against the lower portion of the wall elements in the same manner.

34. The housing of claim 32, wherein each wall element comprises in addition, a flange integral with the curve surface at each longitudinal edge of the curved element.

35. The housing of claim 34, wherein each flange extends outwardly from the curve surface.

36. The housing of claim 34 wherein each flange extends inwardly of the curve surface, whereby when the wall elements are joined the flanges extend inwardly toward the interior of the tube.

* * * * *